Aug. 13, 1968   F. HEDEN   3,396,654
COFFEE MAKER

Filed April 18, 1967   2 Sheets-Sheet 1

INVENTOR
FOLKE HEDEN

BY Wenderoth, Lind + Ponack,
ATTORNEYS

Aug. 13, 1968  F. HEDEN  3,396,654
COFFEE MAKER
Filed April 18, 1967  2 Sheets-Sheet 2

INVENTOR
FOLKE HEDEN

BY Wenderoth, Lind & Ponack
ATTORNEYS

United States Patent Office 3,396,654
Patented Aug. 13, 1968

3,396,654
COFFEE MAKER
Folke Heden, Vineland, N.J., assignor of one-half to Anthony J. D'Angelo, Vineland, N.J.
Continuation-in-part of application Ser. No. 591,265, Nov. 1, 1966. This application Apr. 18, 1967, Ser. No. 631,667
10 Claims. (Cl. 99—314)

ABSTRACT OF THE DISCLOSURE

A coffee maker consists essentially of an upwardly open pot proper and a pouring spout adjacent the top thereof, a pump-and-extractor assembly in the pot, and a combination cover-and-inwardly-extending-partition or-baffle member disposed substantially concentrically within the pot and substantially concentrically about the pump-and-extractor assembly, the inward extent of the partition or baffle member being such that, in the assembled coffee maker, the lower portion thereof is immersed in the water contained in the pot for the coffee making, whereby the coffee extraction takes place essentially out of contact with air. The pump-and-extractor assembly advantageously comprises a ground coffee bean-container, the top and bottom of which are perforated for passage of liquid therethrough, and an auxiliary drip interceptor and liquid distributor disposed beneath the container and substantially coextensive in extent with the bottom of the latter, said interceptor-distributor consisting essentially of a peripherally upward flanged plate member.

---

The present application is a continuation-in-part of copending application, Ser. No. 591,265, filed Nov. 1, 1966, which is a continuation-in-part of copending application, Ser. No. 585,183, filed Oct. 7, 1966 (both now abandoned).

The present invention is concerned with an improvement in coffee maker construction whereby the production of coffee with maximal retention of aroma and flavor and with minimal content of oxidation products, is made possible.

A primary factor in the formation of prejudicial constituents in coffee, i.e. as beverage, is said to be the production of oxidation products in the preparation of the beverage. A major object of the present invention is the embodiment of means whereby the formation of such oxidation products is reduced to an absolute minimum and the quality of the obtained coffee is of the highest.

Briefly stated, the said object is realized according to the present invention with the aid of a constructionally simple but highly effective assembly unit which is readily adaptable to conventional coffee makers and which makes possible the extraction proper of the coffee from the ground coffee bean with maximal exclusion of air (oxygen), with minimal boiling in the extraction zone during the extraction process, and with substantially uniform maintenance of a constant pressure in the said zone, all of which factors contribute to the realization of the object in view—namely, the preparation of a good cup of coffee.

The foregoing is primarily achieved by an expedient which, concisely stated, consists of a partition or baffle which encompasses the pump-and-coffee-container assembly and which, together with the coffee pot cover with which the baffle is integrally associated, on the one hand, and the water in the pot and into which the lower end of the baffle extends, on the other hand, establishes an enclosed "extraction chamber" which is essentially free of oxygen and wherein the coffee extraction can be carried out at a "simmering" temperature—i.e. at the point of boiling—and with minimum pressure fluctuation.

In a secondary aspect, the realization of the object of the invention is enhanced by constructional modifications in the pump-and-coffee-container assembly which functions particularly to reduce the quantity of air in the ground coffee bean-container proper and to facilitate rapid realization of uniform coffee beverage.

Presently preferred illustrative embodiments are set forth, by way of example in the following detailed exposition, with reference to the accompanying drawings in which FIG. 1 is a view partly in vertical cross section and partly in elevation, of a novel coffee-maker assembly according to the present invention;

Figure 1:
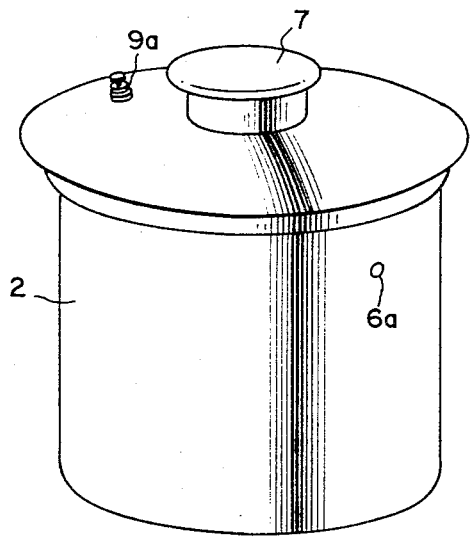

As shown in FIG. 1, reference numeral 1 designates an essentially conventional coffee pot minus the usual cover. The coffee pot 1 is provided in the standard manner with a pouring spout 8 whereby in addition to enabling discharge of the brewed coffee from the interior of the pot, flow of air from the interior of the latter to the exterior is possible. This essentially constitutes one element of the novel assembly according to the present invention.

A second element of the said assembly is constituted by the ground coffee bean-container and associated pump member 3. The coffee-container 3a is of a top- and bottom-perforated metallic cylindrical enclosure structure, and provides a chamber for housing the regular ground coffee to be extracted. The pump member consists essentially of a vertical elongated hollow cylindrical tube of relatively small diameter provided intermediately of its ends with small external annular enlargements 3' and 3" for supporting respectively the container 3a and, if desired, a so-called "interceptor for drips" 3b whereby equalized distribution of the coffee extract into the water in the pot can be achieved.

Figure 3:
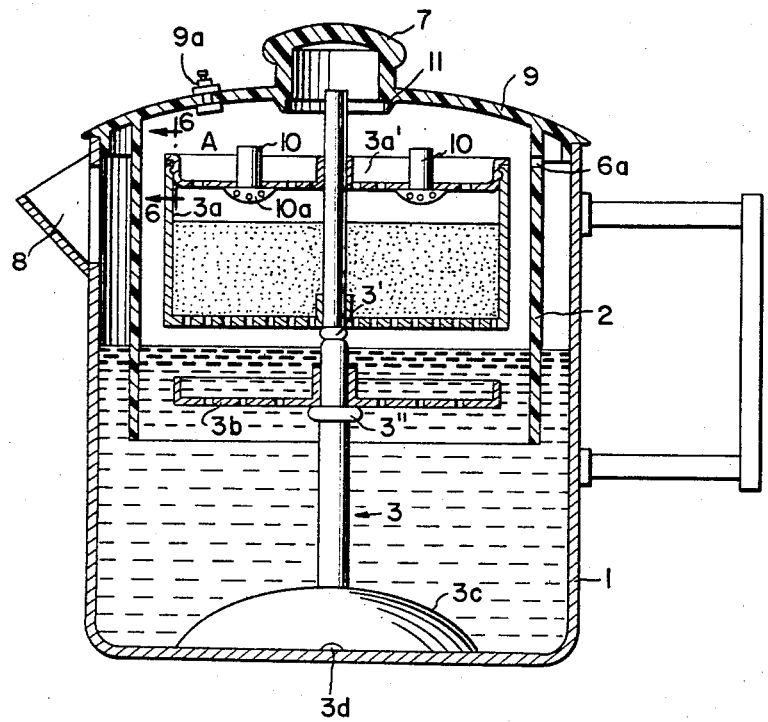
FIG. 3 is a view corresponding to FIG. 1 but showing a modified form of construction, particularly of the ground coffee-bean container.

In the absence of the interceptor 3b, the diameter of which advantageously is somewhat less than that of container 3a, the tendency is for relatively concentrated (heavy) coffee extract from the coffee grounds to drop rapidly down through to the bottom of the water in the coffee pot and to be recirculated by the pump 3 before such extract has an opportunity to be disseminated or diffused throughout the water. The interceptor 3b makes possible a more uniform distribution of the percolating coffee throughout the liquid extract. While the interceptor, as illustrated in FIG. 1, is imperforate, it is also possible for the bottom thereof to be perforate, as shown in FIG. 3.

The lowermost end of the hollow rod-shaped member 3 is in the form of an enlarged bottom and downwardly-open parti-spherical member 3c, the lower edge of which is notched, as shown e.g. at 3d, and rests, in use, on the inside of the bottom of the pot 1.

The container 3a is closed at its top by the perforated lid member 3a', the slightly raised peripheral flange of which simply rests on the upper circular edge of the upstanding wall of container 3a.

The third and characteristic element of the assembly according to the present invention and which is indispensable to the realization of the superior product achieved by the invention is constituted by what may be designated as a combination pot-cover and inside extraction chamber-forming unit. This unit comprises a per se essentially conventional cover 9 for the upper open end of the coffee pot 1. This cover is preferably provided centrally thereof with the usual dome 7 of transparent material such as glass or the like whereby, in the making of the coffee, the percolation of the latter is visible. Extending downwardly from the interior surface of the cover 9 and disposed concentrically thereof and of the pump-and-container assembly, when the latter is in the pot, is a cylindrical partition member 2 which is of a diameter sufficient freely to encompass the coffee container 3a and drip member 3b, and of a length such that the lower end thereof extends below the surface of the water contained in the pot proper 1. An equalizing vent (circular opening) 6a is provided at the upper end of the cylindrical partition member 2 and extends through the latter, interconnecting the interior of the extraction chamber with the atmosphere exteriorly encompassing the upper end of the said partition. The diameter of such vent or opening 6a is variable according to the size of the pot; a diameter of about 2 to 4 millimeters is generally optimal.

Figure 2:
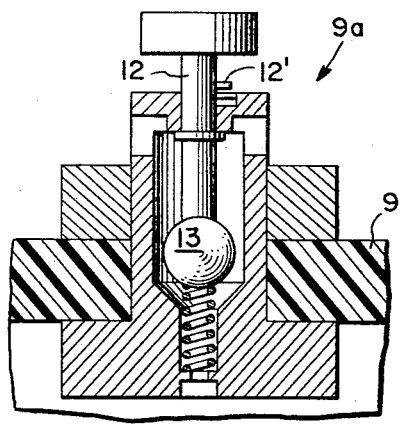
FIG. 2 is a perspective view of the extraction chamber-forming sub-assembly according to this invention.

FIG. 2 of the drawings shows the aforesaid characteristic novel unit according to the invention.

When, during the coffee beverage-making procedure (hereinafter described in detail), liquid accumulates in container 3a, due to the fact that the inflow through the top 3a' exceeds the outflow through the perforated bottom, and the level of liquid above the coffee grains rises with consequent application of upward pressure on the air above such grains, the top 3a' may be raised by such pressure to vent the air which can then escape via vent 6a and nozzle outlet 8.

Figure 4:
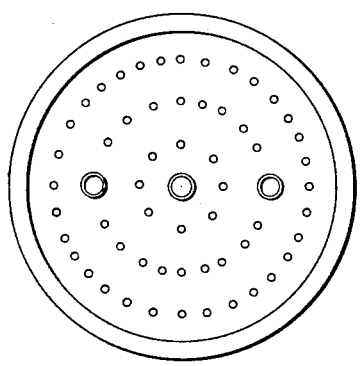
FIG. 4 is a top plan view of the ground coffee bean-container.

An alternative construction of cover 3a' is shown in FIGS. 3 and 4. In accordance with this modified embodiment, a number of upstanding vent pipes 10 are provided on cover 3a'; while the drawings show two such vent pipes, an additional number may be provided. These vent pipes 10 are integrated with the cover 3a' proper in any desired and per se conventional manner, as for example by welding or in any other suitable way.

The lower end of each vent pipe 10 is advantageously covered by a screen member of perforated plate 10a, thus preventing possible clogging of the vent pipe by coffee grains during the percolation.

The upward extent of each vent pipe 10 is such that its upper edge is above the level of the peripheral flange whereby the cover 3a' is seated on the container, so that each pipe always remains unobstructed to free passage of air. The pipes 10 are so positioned relative to the drip flange 11 which depends from the interior of the coffee pot cover 9 that they—the said pipes—are out of range of the downwardly dripping liquid from the said flange 11. According to this modification, venting of the air from above the coffee grains in container 3a takes place via the vent pipes 10 and without displacement of the cover 3a'.

Figure 6:
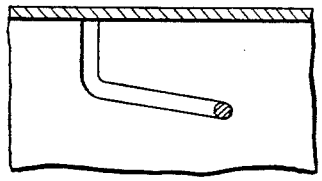
FIG. 6 is an enlarged sectional view taken along line 6—6 of FIG. 3.

The cover 3a' in the second-described, i.e. modified, embodiment need not simply rest on the container 3a; in fact, it is advantageous that easily-releasable and per se conventional locking means of, for example the cam and inclined cam-like groove type or the like, as shown by way of example in FIG. 6, be provided whereby the cover 3a' can be securely retained in place during the extraction by a simple twisting operation after such cover is put in place. Release of the cover 3a' would then be easily realized by reverse twisting of the cover 3a' relative to the container 3a, just prior to removal of the cover.

A supplemental vent 9a of per se conventional construction is provided in the cover member 9. This vent 9a is of the manually operable type for opening and closing.

In preparing coffee by means of the coffee-making assembly according to the present invention, the procedure is as follows:

Cold water is added to the capacity-indicating line (e.g. 6-cups, 9-cups, etc.) provided on the pot. This may be in the form of an etched line where the pot is a glass pot or may be an impressed demarcation line where the pot is a metal pot. The level of the water is e.g. as shown in FIG. 1. The cold water is first brought to a boil, the pump assembly and the FIG. 2 unit are then put into place on and in the pot—separately or as a unit—with valve 9a in open position, the heat is then adjusted to the "simmering" point, i.e. such heat being concentrated within the diameter of the pump bottom as is readily realizable by means e.g. of a conventional electric stove, whereby simmering continues throughout the entire pot while percolation takes place via the pump assembly. As soon as percolation ensues, the valve 9a is manually closed. Pressure thereupon builds up in enclosed chamber A, thereby slightly depressing the level of the water interiorly of the partition and correspondingly slightly raising the level of the water exteriorly of such partition. Effectively, however, the difference in levels is almost instantaneously equalized through the vent opening 6a, whereby the water level remains essentially constant.

The extract from the perforated container drips onto the drip interceptor 3b, from which it is uniformly distributed into the simmering water to form the eventual coffee beverage.

The superior taste, flavor and aroma of the resultant coffee is ascribable to the fact that the actual extraction process is effected in the substantially total absence of oxygen (air). The sole contact between the air (oxygen) and the coffee during the coffee making is one of reduced area at the liquid level outside the partition or baffle 2, and even here there is never any boiling, but only simmering, during coffee making. Moreover, the pressure above the liquid interiorly of the chamber A remains essentially constant throughout the coffee making process. In addition, since this pressure is in excess of atmospheric, "equalization" of pressure takes place through the vent only in a direction from the interior of the extraction chamber A to the chamber exteriorly of the member 2.

Upon completion of the coffee making process—determinable e.g. by the color of the resultant coffee and usually requiring about 6 to 7 minutes—the pot is removed from the fire, the assembly or assemblies are removed from the pot, and the coffee is ready to be poured.

The materials of which the constituent parts of the coffee maker according to this invention are made, are variable. Thus, the parts may be made of metal, glass, plastic materials and the like or of various combinations of these materials.

Where the FIG. 2 unit is a one-piece unit, as is preferred according to this invention, it can be made of any of the aforesaid materials. Alternatively, the partition or baffle member can be separately fabricated and joined to the cover member 9 in any desirable and per se conventional manner.

Cylindrical configuration is only the most convenient one. The parts may be other than cylindrical, e.g. polygonal etc., if desired.

Although the foregoing disclosure relates to the invention at the so-called coffee pot level, the principle of the invention is equally applicable to commercial or industrial installations, the container for the water being made into coffee beverage being in such case within the concept and terms "coffee pot."

Figure 5:
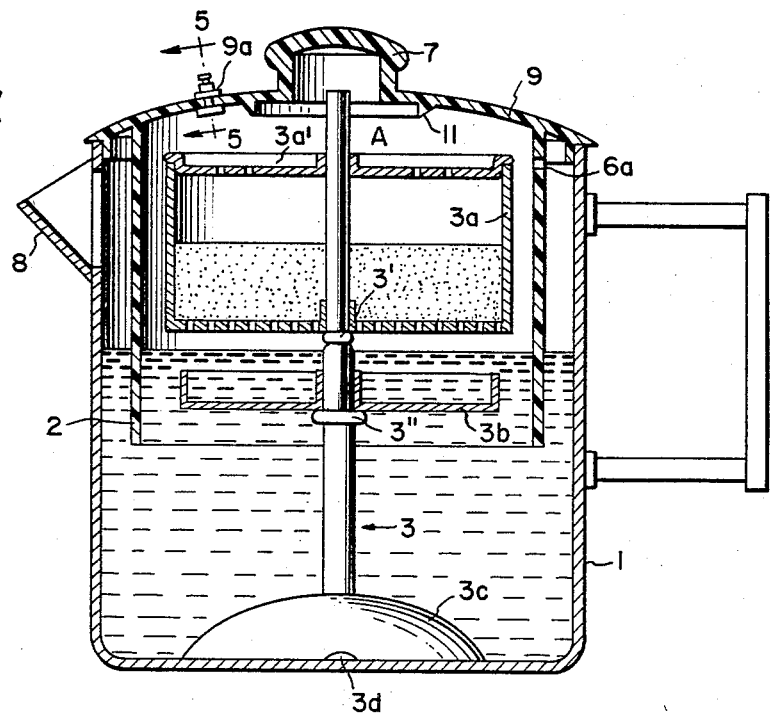
FIG. 5 is an enlarged fragmentary sectional view through a representative valve construction, arranged on the coffee pot cover.

One of the many possible constructions of supplemental valve 9a is shown by way of example in FIG. 5. The valve stem 12 terminates at its lower end in a ball member 13 which is normally lifted from its seat by a coil spring (as shown). When it is desired to close the valve, downward pressure is manually exerted on the top of the valve; this seats ball 13 in closing position on its seat, after which by a simple twist lug 12' is moved into locking position in the juxtaposed right-angular slot. Release is effected by a simple reverse twist. Any other per se conventional and manually operable valve member 9a can be employed in lieu of that illustrated, e.g. a toggle valve.

The pump-and-coffee-container assembly consisting of the pump and, mounted thereon, the container 3a and interceptor 3b, can—if desired—be constituted by the several individually separable parts, or these parts may be integrated in any suitable and per se conventional manner, as for example by soldering or the like, into an assembly which can be handled as a unit. The cover 3a' is, in any case, made removable.

What is claimed is:

1. A coffee maker consisting essentially of an upwardly open pot proper and a pouring spout adjacent the top thereof, a pump-and-extractor assembly in said pot, and a combination cover-and-inwardly-extending-partition or -baffle member disposed concentrically within the said pot and concentrically about the pump-and-extractor assembly, the inward extent of said partition or baffle member being such that, in the assembled coffee maker, the lower portion thereof is immersed in the water contained in the pot for the coffee making, whereby the coffee extraction takes place essentially out of contact with air.

2. A coffee maker according to claim 1, wherein the pump-and-extractor assembly comprises a ground coffee bean-container, the top and bottom of which are perforated for passage of liquid therethrough, and an auxiliary drip interceptor and liquid distributor disposed beneath the said container and substantially coextensive in extent with the bottom of the latter, said interceptor-distributor consisting essentially of a peripherally upward flanged plate member.

3. A construction according to claim 2, wherein the plate member is perforated.

4. A construction according to claim 2 wherein the plate member is imperforate.

5. A construction according to claim 2, wherein the pump-and-extractor assembly is, apart from the top of the container, an integrally associated unit.

6. A coffee maker according to claim 1, wherein the pump-and-extractor assembly comprises a ground coffee bean-container, the top and bottom of which are perforated for passage on liquid therethrough, and the top of said container being provided with upwardly extending air vent pipes, the upper end of each of which is above the uppermost level of said top.

7. A construction according to claim 6 wherein said top is releasably locked to said container during percolation.

8. A construction according to claim 1 wherein the coffee pot cover is provided with a manually operable vent valve.

9. An assembly for use in a coffee maker consisting essentially of a cover member and an inwardly projecting, substantially concentrically disposed cylindrical extension, the extent of which is such that, in the assembled coffee maker, the lower portion thereof is immersed in the water contained in the pot for the coffee making, whereby the coffee extraction takes place essentially out of contact with air.

10. An assembly according to claim 9, said extension being provided with a vent extending therethrough, said vent being positioned adjacent the cover member.

References Cited
UNITED STATES PATENTS

| | | | |
|---|---|---|---|
| 1,077,289 | 11/1913 | Nash | 99—310 |
| 2,283,957 | 5/1942 | Steinmetz | 99—310 X |
| 2,660,107 | 11/1953 | Cappello | 99—312 |
| 2,718,844 | 9/1955 | Schwinger | 99—290 |
| 3,208,370 | 9/1963 | Steriss | 99—312 X |

ROBERT W. JENKINS, *Primary Examiner.*